(12) United States Patent
Yashiro et al.

(10) Patent No.: US 9,846,512 B2
(45) Date of Patent: Dec. 19, 2017

(54) METHOD FOR INSPECTING TOUCH-PANEL ELECTRODE SUBSTRATE

(71) Applicant: Sharp Kabushiki Kaisha, Osaka-shi, Osaka (JP)

(72) Inventors: Yuhji Yashiro, Osaka (JP); Kazuya Yoshimura, Osaka (JP); Shogo Hayashi, Osaka (JP); Kazutoshi Kida, Osaka (JP); Shinji Matsumoto, Osaka (JP); Takenori Maruyama, Osaka (JP); Tsuyoshi Ohmori, Osaka (JP); Akira Yasuta, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 170 days.

(21) Appl. No.: 14/889,637

(22) PCT Filed: Feb. 27, 2014

(86) PCT No.: PCT/JP2014/054892
§ 371 (c)(1),
(2) Date: Nov. 6, 2015

(87) PCT Pub. No.: WO2014/208129
PCT Pub. Date: Dec. 31, 2014

(65) Prior Publication Data
US 2016/0124575 A1 May 5, 2016

(30) Foreign Application Priority Data

Jun. 28, 2013 (JP) .................................. 2013-137255

(51) Int. Cl.
*G06F 3/044* (2006.01)
*G06F 3/0488* (2013.01)
*G06F 3/041* (2006.01)

(52) U.S. Cl.
CPC ............ *G06F 3/0418* (2013.01); *G06F 3/044* (2013.01); *G06F 3/0488* (2013.01);
(Continued)

(58) Field of Classification Search
CPC ....... G06F 3/044; G06F 3/0416; G01R 15/16; G01R 15/165; G01R 27/26; G01R 27/2605
See application file for complete search history.

(56) References Cited

U.S. PATENT DOCUMENTS 6,956,563 B2 * 10/2005 Yamashita .............. G06F 3/041
345/173
9,182,866 B2 * 11/2015 Inagaki .................. G06F 3/0418
(Continued)

FOREIGN PATENT DOCUMENTS

| CN | 101819496 A | | 9/2010 |
|---|---|---|---|
| JP | 2010-86026 A | | 4/2010 |
| JP | 2010086026 A | * | 4/2010 |

OTHER PUBLICATIONS

Official Communication issued in International Patent Application No. PCT/JP2014/054892, dated May 20, 2014.

*Primary Examiner* — Patrick F Marinelli
(74) *Attorney, Agent, or Firm* — Keating & Bennett, LLP

(57) ABSTRACT

Provided is a method for inspecting a touch panel with which method it is possible to perform an inspection with high accuracy and to allow an improvement in yield. A drive signal is supplied to either one of sensor electrodes (12) and an inspection electrode (142), a plurality of sense signals related to the respective sensor electrodes (12) are obtained from the other of the sensor electrodes and the inspection electrode, and conditions of the sensor electrodes (12) are determined according to the sense signals.

6 Claims, 15 Drawing Sheets

(52) U.S. Cl.
CPC .............. *G06F 2203/04103* (2013.01); *G06F 2203/04104* (2013.01); *G06F 2203/04808* (2013.01)

(56) References Cited

U.S. PATENT DOCUMENTS

| | | | | |
|---|---|---|---|---|
| 9,207,273 | B2* | 12/2015 | Ko | G01R 31/2829 |
| 9,213,057 | B2* | 12/2015 | Chen | G01R 31/28 |
| 9,410,999 | B2* | 8/2016 | Alatas | G01B 7/023 |
| 2002/0140442 | A1* | 10/2002 | Ishioka | G01R 31/312 |
| | | | | 324/754.21 |
| 2002/0163342 | A1* | 11/2002 | Ishioka | G01R 31/2805 |
| | | | | 324/527 |
| 2003/0189555 | A1* | 10/2003 | Yamashita | G06F 3/041 |
| | | | | 345/173 |
| 2008/0068229 | A1* | 3/2008 | Chuang | G06F 3/0418 |
| | | | | 341/34 |
| 2012/0127117 | A1* | 5/2012 | Ku | G06F 3/044 |
| | | | | 345/174 |
| 2012/0280934 | A1* | 11/2012 | Ha | G06F 11/2221 |
| | | | | 345/174 |
| 2013/0176519 | A1* | 7/2013 | Hayama | G02F 1/13338 |
| | | | | 349/113 |
| 2014/0160072 | A1* | 6/2014 | Inagaki | G06F 3/0418 |
| | | | | 345/174 |
| 2014/0197845 | A1* | 7/2014 | Ko | G01R 31/2829 |
| | | | | 324/537 |
| 2014/0218056 | A1* | 8/2014 | Alatas | G01B 7/023 |
| | | | | 324/679 |
| 2015/0212625 | A1* | 7/2015 | Sakamoto | G06F 3/03545 |
| | | | | 345/174 |
| 2015/0233995 | A1* | 8/2015 | Pratap | G01R 31/2829 |
| | | | | 324/509 |
| 2015/0324030 | A1* | 11/2015 | Jun | G06F 3/044 |
| | | | | 345/174 |
| 2016/0054366 | A1* | 2/2016 | Takahashi | G06F 3/044 |
| | | | | 324/537 |
| 2016/0124575 | A1* | 5/2016 | Yashiro | G06F 3/044 |
| | | | | 345/173 |
| 2016/0139191 | A1* | 5/2016 | Yashiro | G01R 31/02 |
| | | | | 324/750.16 |

* cited by examiner

50

Capacitance
(relative value)
- 2-3
- 1-2
- 0-1
- -1-0

Disconnection line

Disconnection line

```
              Sense1    Sense2    Sense3    Sense4    Sense5
                |         |         |         |         |
     Drive1 —— 1.0 —— 1.0 —— 1.0 —— 1.0 —— 1.0 ——
     Drive2 —— 1.0 —— 1.1 —— 1.0 —— 1.0 —— 1.5 ——
     Drive3 —— 1.0 —— 1.0 —— 1.6 —— 1.6 —— 1.9 ——
     Drive4 —— 1.0 —— 1.0 —— 1.4 —— 1.9 —— 1.8 ——
     Drive5 —— 1.1 —— 1.6 —— 2.0 —— 2.0 —— 2.1 ——
                |         |         |         |         |
```

(b)

```
              Sense1    Sense2    Sense3    Sense4    Sense5
                |         |         |         |         |
     Drive1 —— 1.1 —— 1.0 —— 1.1 —— 1.0 —— 1.0 ——
     Drive2 —— 1.0 —— 1.0 —— 1.0 —— 1.0 —— 1.5 ——
     Drive3 —— 1.1 —— 1.1 —— 0.9 —— 1.6 —— 1.9 ——
     Drive4 —— 1.0 —— 1.0 —— 1.4 —— 1.9 —— 1.8 ——
     Drive5 —— 1.1 —— 1.6 —— 2.0 —— 2.0 —— 2.1 ——
                |         |         |         |         |
```

(c)

```
              Sense1    Sense2    Sense3    Sense4    Sense5
                |         |         |         |         |
     Drive1 —— 0.0 —— 0.0 —— 0.0 —— 0.0 —— 0.0 ——
     Drive2 —— 0.1 —— 0.1 —— 0.0 —— 0.0 —— 0.0 ——
     Drive3 —— -0.1 —— -0.1 —— 0.7 —— 0.0 —— 0.0 ——
     Drive4 —— 0.0 —— 0.0 —— 0.0 —— 0.0 —— 0.0 ——
     Drive5 —— 0.0 —— 0.0 —— 0.0 —— 0.0 —— 0.0 ——
                |         |         |         |         |
```

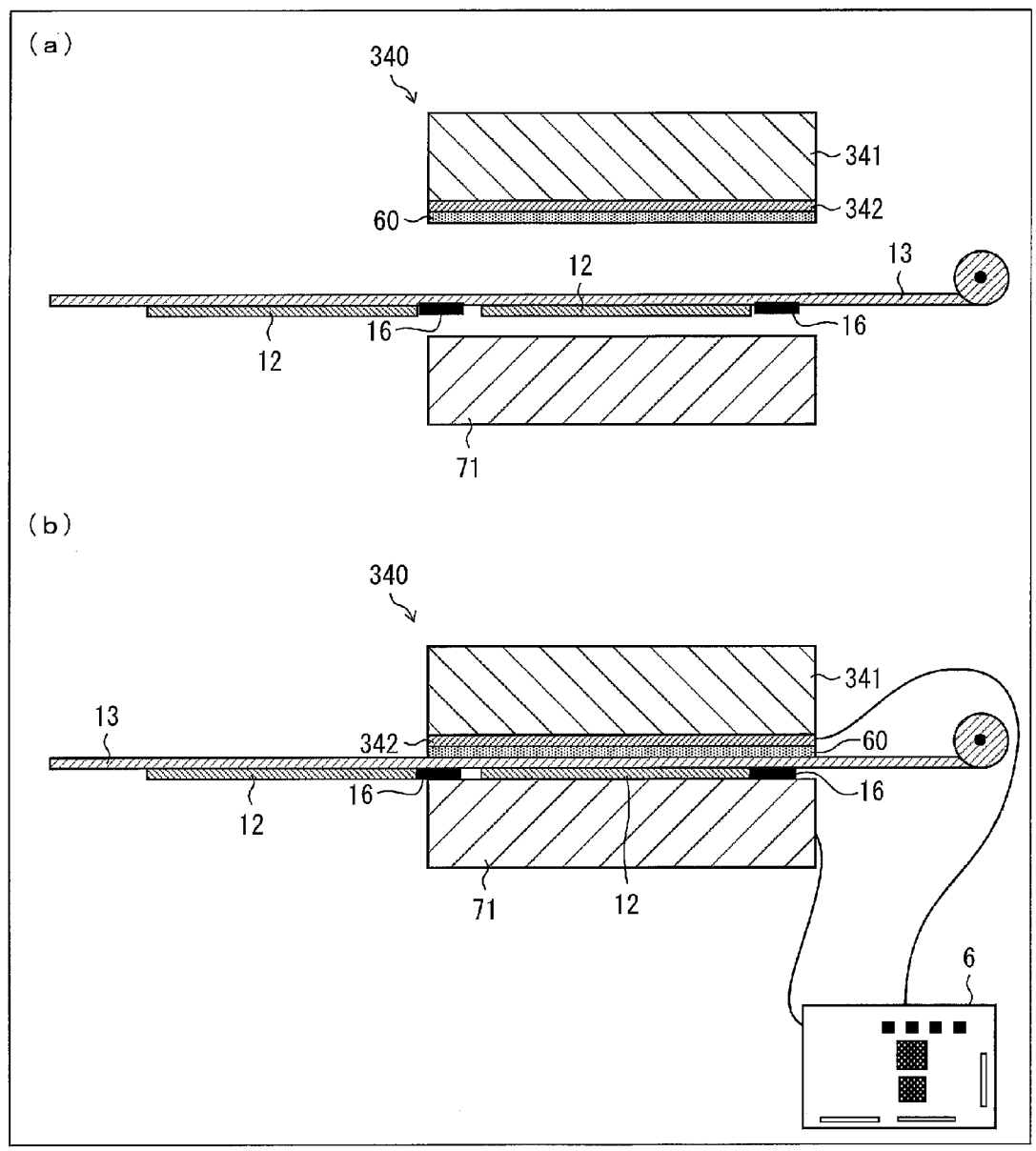

METHOD FOR INSPECTING TOUCH-PANEL ELECTRODE SUBSTRATE

TECHNICAL FIELD

The present invention relates to a method for inspecting a touch-panel electrode substrate.

BACKGROUND ART

In recent years, there is a rapid tendency to mount touch panels on various electronic devices, for example, information devices such as smartphones or vending machines such as ticket vending machines. Recently, a capacitive type touch panel is widely used because of its capability of accepting multi-touch.

The capacitive type touch panel includes (i) a plurality of X sensor electrodes and (ii) a plurality of Y sensor electrodes arranged so as to be orthogonal to the X sensor electrodes in a plan view. According to the capacitive type touch panel, drive signals are supplied to the Y sensor electrodes and sense signals are taken from the X sensor electrodes, so that capacitances formed between the X sensor electrodes and the Y sensor electrodes are detected. Based on amounts of changes in the capacitances, it is possible to calculate a position of a detection target on a detection surface.

In a case where (i) disconnection of a sensor electrode (hereinafter, the term "sensor electrode" refers to the X sensor electrode and/or the Y sensor electrode) occurs or (ii) a short circuit (leakage) occurs between sensor electrodes, it is impossible to detect a capacitance between the sensor electrodes, and thus it is impossible to calculate the position of the detection target. In order to deal with this, an inspection step of inspecting whether or not the touch panel operates normally is required.

According to a conventional inspection step, (i) a contact probe is used for inspecting conductivity of sensor electrodes arranged on a sensor substrate, and (ii) in a case where a disconnection or a short circuit is found in the sensor electrodes as a result of the inspection, the sensor substrate is determined to be defective.

However, although the above conventional inspection method is able to determine whether or not the sensor substrate is defective according to the presence or absence of the disconnection or short circuit of the sensor electrodes, the above conventional inspection method is not able to accurately detect a widened or thinned sensor electrode. Despite the fact that the widened or thinned sensor electrode greatly affects detection accuracy of the touch panel, the conventional inspection method is not able to accurately detect the widened or thinned sensor electrode. Further, for example, in a case of performing, according to the conventional inspection method, an inspection on a sensor substrate including (i) sensor electrodes arranged in a diamond pattern and (ii) dummy electrodes each provided, as a floating electrode, between adjacent ones of the sensor electrodes, it is necessary to bring the contact probe into contact with each of the dummy electrodes in order to examine the presence or absence of leakage between the dummy electrode and its respective sensor electrode. This results in a time-consuming inspection process.

Patent Literature 1 discloses an inspection method including (i) causing an inspection jig which includes inspection electrodes to face an inspection target sample (sensor module) which includes first sensor electrodes and second sensor electrodes orthogonal to each other, (ii) changing electric potentials of the inspection electrodes to a given fixed value so as to so as to simulate a state where the sensor module is touched by an inspection target, and (iii) detecting a defect caused by, e.g., disconnection of a sensor electrode according to an amount of change in a capacitance between the sensor module and the inspection jig.

With the above inspection method, it is possible to perform inspections without determination variations among different inspections.

CITATION LIST

Patent Literature

Patent Literature 1

Japanese Patent Application Publication, Tokukai, No. 2010-86026 (Publication date: Apr. 15, 2010)

SUMMARY OF INVENTION

Technical Problem

However, according to the inspection method of Patent Literature 1, the electric potentials of the inspection electrodes are changed to a given fixed value in order to create a condition where the inspection target is pseudo-touched by a finger, and the amount of change in the capacitance between the sensor module and the inspection jig is detected by use of the first sensor electrodes and the second sensor electrodes.

Namely, the inspection method of Patent Literature 1 is applicable to a sensor module including the first sensor electrodes and the second sensor electrodes. In other words, for a touch panel made of (i) a first sensor substrate including X sensor electrodes and (ii) a second sensor substrate including Y sensor electrodes, an inspection according to the inspection method of Patent Literature 1 cannot be performed on one of the first and second sensor substrates before the first and second sensor substrates are bonded to each other. This causes a problem of a decrease in yield.

Further, according to an inspection method as those of Patent Literature 1 for creating a condition where the inspection target is pseudo-touched by a detection target, the inspection result is affected by various external factors such as a shape of each inspection electrode and/or a distance between the inspection jig and the sensor module. Therefore, according to such a method, it is difficult to detect a small difference in capacitance between the sensor electrodes, which has an influence on detection resolution and/or positional accuracy in the inspection, and thus it is impossible to perform an inspection with high accuracy.

The present invention has been made in view of the above problem. It is an object of the present invention to provide a method for inspecting a touch panel which method is able to perform an inspection with high accuracy and to improve a yield.

Solution to Problem

In order to attain the above object, a method for inspecting a touch panel in accordance with an aspect of the present invention is a method for inspecting a touch panel which includes a plurality of sensor electrodes extending in a substantially same direction, said method comprising the steps of: (I) supplying a drive signal to either one of the plurality of sensor electrodes and at least one inspection electrode in a state where capacitances are formed between the plurality of sensor electrodes and the at least one inspection electrode; (II) obtaining a plurality of sense signals from the other one of the plurality of sensor electrodes and the at least one inspection electrode, the plurality of sense signals being generated according to the drive signal and the capacitances, and the plurality of sense signals being related to the respective plurality of sensor electrodes; and (III) determining conditions of the plurality of sensor electrodes according to the plurality of sense signals.

Advantageous Effects of Invention

According to the aspect of the present invention, it is possible to provide a method for inspecting a touch panel which method is able to perform an inspection with high accuracy and to improve a yield.

BRIEF DESCRIPTION OF DRAWINGS

FIG. 13 illustrates how a defective part is identified according to a result of comparison of between capacitances of two kinds of sensor substrates. (a) of FIG. 13 illustrates values of capacitances at respective intersections on a sensor substrate which is an inspection target. (b) of FIG. 13 illustrates values of capacitances at respective intersections on a comparative sensor substrate. (c) of FIG. 13 illustrates differences between (i) the values of the capacitances at the respective intersections on the sensor substrate and (ii) the values of the capacitances at the respective intersections on the comparative sensor substrate.

FIG. 15 shows cross-sectional views of a base film and an inspection substrate for explaining another inspection method of Embodiment 3 of the present invention. (a) of FIG. 15 shows a state where the base film and the inspection substrate are not in close contact with each other. (b) of FIG. 15 shows a state where the base film and the inspection substrate are in close contact with each other.

DESCRIPTION OF EMBODIMENTS

Embodiment 1

The following description will discuss in detail an embodiment of the present invention with reference to FIGS. 1 through 6.

<Configuration of Touch Panel>

The following description will first discuss a basic configuration of a touch panel, which is to be inspected according to an inspection method of Embodiment 1.

Figure 1:
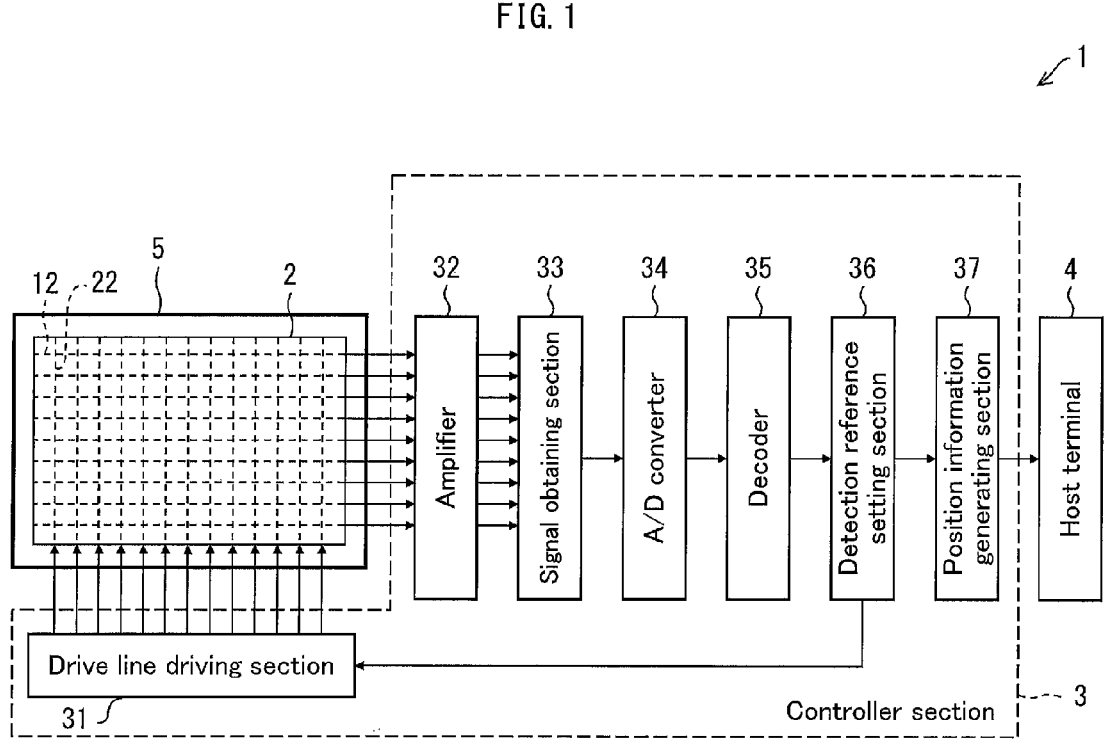
FIG. 1 is a block diagram illustrating a configuration of a touch panel.

FIG. 1 is a block diagram illustrating a configuration of the touch panel.

A touch panel 1 includes (i) a sensor section 2 for detecting a contact or proximity of a detection target such as a finger of a user, (ii) a controller section 3 for calculating a position where the detection target is in contact with (or in proximity to) the sensor section 2, and (iii) a host terminal 4.

The sensor section 2 (i) is provided so as to cover a display surface of a display device 5 and (ii) constitutes a detection surface of the touch panel 1. The sensor section 2 includes a touch-panel electrode substrate including (i) a plurality of X sensor electrodes 12 extending in a substantially same direction and (ii) a plurality of Y sensor electrodes 22 orthogonal to the X sensor electrodes 12 in a plan view. The X sensor electrodes 12 are disposed so as to be separated from the Y sensor electrodes 22 at predetermined intervals. Further, capacitances are formed between the X sensor electrodes 12 and the Y sensor electrodes 22.

The controller section 3 includes a drive line driving section 31, an amplifier 32, a signal obtaining section 33, an A/D converter 34, a decoder 35, a detection reference setting section 36, and a position information generating section 37.

The Y sensor electrodes 22 are connected to the drive line driving section 31. The drive line driving section 31 supplies drive signals to the Y sensor electrodes 22 sequentially or simultaneously. Consequently, the Y sensor electrodes 22 function as drive lines. Note that the supply of the drive signals to the Y sensor electrodes 22 is performed, for example, by application of pulsed voltages to the Y sensor electrodes 22.

The X sensor electrodes 12 are connected to the amplifier 32. The amplifier 32 obtains, from the X sensor electrodes 12, sense signals which are based on the drive signals and capacitances formed between the X sensor electrodes 12 and the Y sensor electrodes 22. In a case where a detection target is in contact with or in proximity to the sensor section 2, corresponding one(s) of the capacitances changes, and consequently corresponding one(s) of the sense signals also changes. Note that the sense signals are obtained as, e.g., voltages applied to the X sensor electrodes 12 or electric currents flowing through the X sensor electrodes 12.

The amplifier 32 amplifies the sense signals and outputs the sense signals thus amplified. The signal obtaining section 33 obtains the sense signals amplified by the amplifier 32, and outputs the sense signals in a time-division manner. The A/D converter 34 converts analog signals outputted from the signal obtaining section 33 to digital signals. Based on the digital signals obtained as a result of the conversion by the A/D converter 34, the decoder 35 calculates an amount of change in capacitance distribution in the sensor section 2. Based on the amount of change in capacitance distribution in the sensor section 2, the detection reference value setting section 36 sets a reference capacitance and outputs the reference capacitance to the drive line driving section 31 and to the position information generating section 37. Based on (i) the amount of change in capacitance distribution in the sensor section 2 and (ii) the reference capacitance set by the detection reference value setting section 36, the position information generating section 37 calculates a position of the detection target on the sensor section 2, and outputs information of the position to the host terminal 4.

Thus, based on the amounts of the changes in capacitances between the electrodes caused by the detection target's contact or proximity to the detection surface, the touch panel 1 is able to calculate the position of the detection target on the detection surface.

<Sensor Electrodes>

Figure 2:
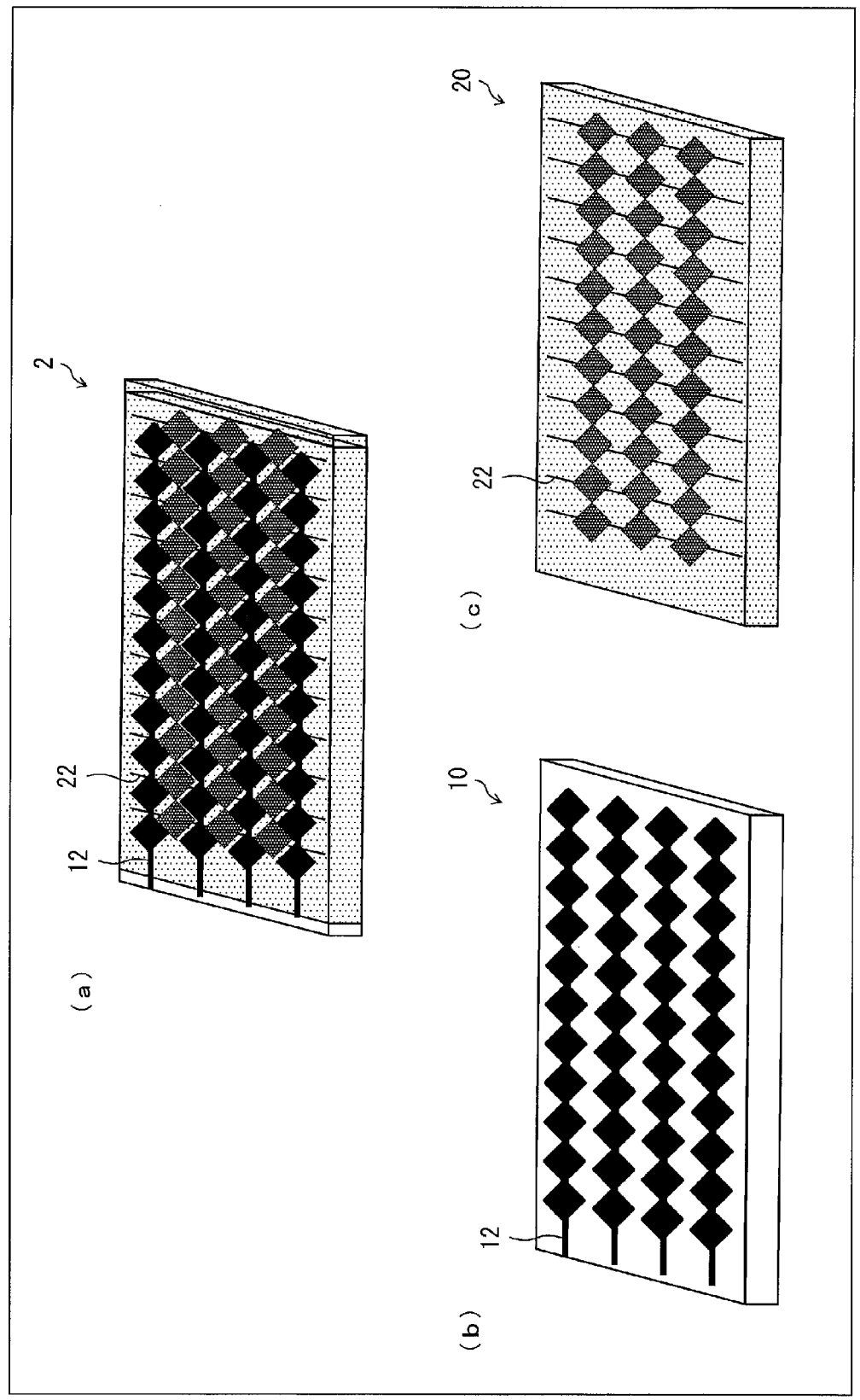
FIG. 2 shows perspective views illustrating a configuration of a sensor section of a touch panel. (a) of FIG. 2 illustrates a stack of a first sensor substrate and a second sensor substrate. (b) of FIG. 2 illustrates the first sensor substrate. (c) of FIG. 2 illustrates the second sensor substrate.

FIG. 2 shows perspective views illustrating a configuration of the sensor section. (a) of FIG. 2 illustrates a stack of a first sensor substrate and a second sensor substrate. (b) of FIG. 2 illustrates the first sensor substrate. (c) of FIG. 2 illustrates the second sensor substrate.

The sensor section 2 includes a first sensor substrate 10 illustrated in (b) of FIG. 2 and a second sensor substrate 20 illustrated in (c) of FIG. 2.

As illustrated in (b) and (c) of FIG. 2, the first sensor substrate 10 includes the plurality of X sensor electrodes 12, and the second sensor substrate 20 includes the plurality of Y sensor electrodes 22. As illustrated in (a) of FIG. 2, the first sensor substrate 10 and the second sensor substrate 20 are bonded to each other so that the X sensor electrodes 12 and the Y sensor electrodes 22 are orthogonal to each other.

FIG. 2 exemplifies, as the sensor electrodes, sensor electrodes arranged in a diamond pattern. However, the present invention is not limited to this. Alternatively, sensor electrodes arranged in a simple matrix pattern can be used.

The X sensor electrodes 12 and the Y sensor electrodes 22 each can be made of, for example, (i) a transparent material such as indium tin oxide (ITO) or (ii) copper or silver shaped into a mesh.

Figure 3:
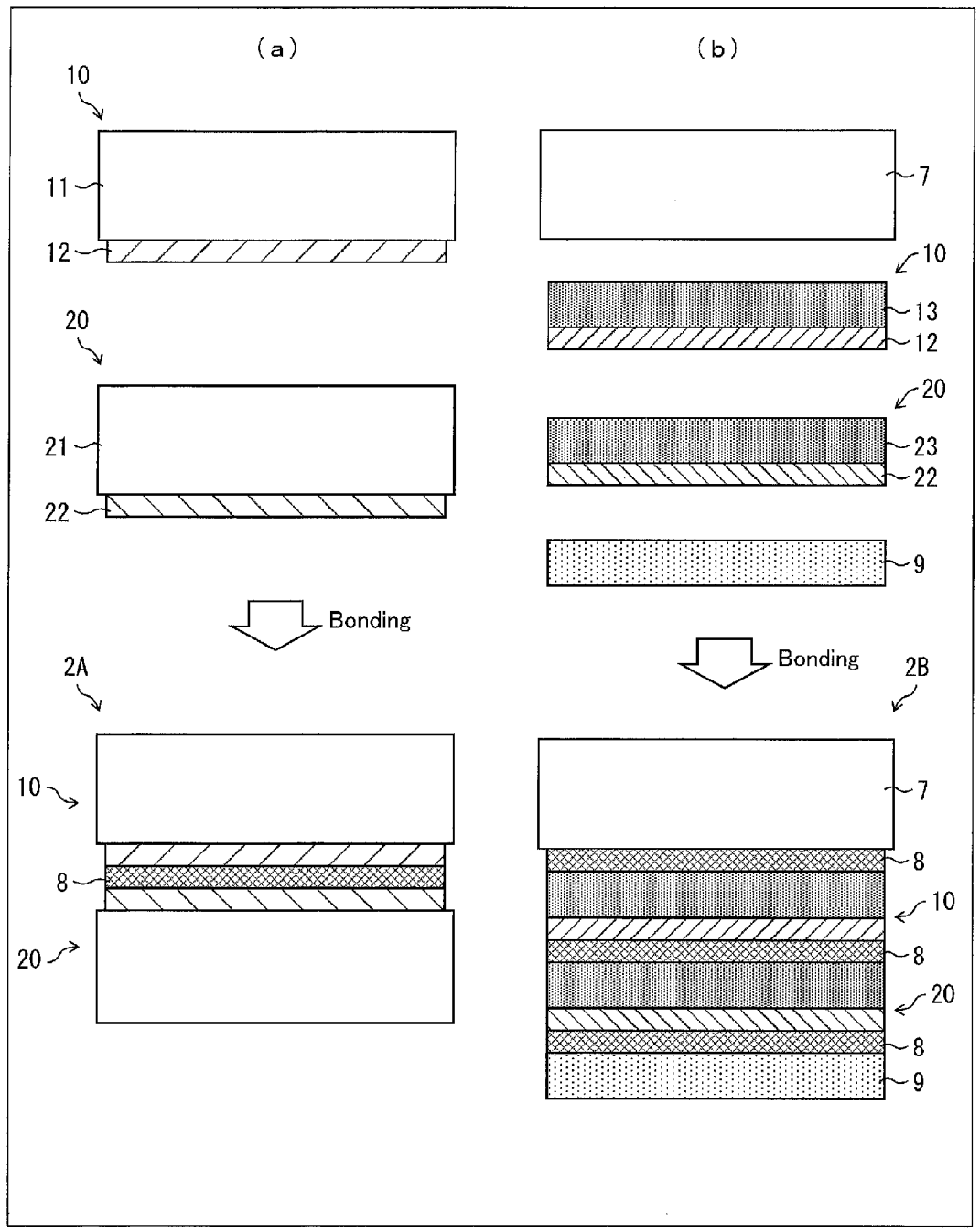
FIG. 3 shows cross-sectional views illustrating a configuration example of a touch panel. (a) of FIG. 3 shows a cross-section of a 2G-type touch panel. (b) of FIG. 3 shows a cross-section of a GFF-type touch panel.

FIG. 3 shows cross-sectional views illustrating a configuration example of a touch panel. (a) of FIG. 3 shows a cross-section of a 2G-type touch panel. (b) of FIG. 3 shows a cross-section of a GFF-type touch panel.

As illustrated in (a) of FIG. 3, a sensor section 2A (touch-panel electrode substrate) of the 2G-type touch panel is configured such that (i) a first sensor substrate 10 including a glass substrate 11 on which X sensor electrodes 12 are formed and (ii) a second sensor substrate including a glass substrate 21 on which Y sensor electrodes 22 are formed are bonded to each other via an adhesion layer 8.

Further, as illustrated in (b) of FIG. 3, a sensor section 2B (touch-panel electrode substrate) of the GFF-type touch panel is configured such that (i) a glass substrate 7, (ii) a first sensor substrate 10 including a base film 13 on which X sensor electrodes 12 are formed, (iii) a second sensor substrate 20 including a base film 23 on which Y sensor electrodes 22 are formed, and (iv) a protection base film 9 are bonded to each other in this order via adhesion layers 8.

As described above, each of the 2G-type touch panel and the GFF-type touch panel is produced by (i) forming the X sensor electrodes 12 and the Y sensor electrodes 22 on different substrates (base materials) and then (ii) bonding the substrates to each other.

<Inspection of Touch Panel>

A value of a capacitance formed between an X sensor electrode 12 and a Y sensor electrode 22 depends on areas of the X sensor electrode 12 and the Y sensor electrode 22. Specifically, in a case where each of the areas of the X sensor electrode 12 and the Y sensor electrode 22 is smaller than a reference area, a capacitance formed between the X sensor electrode 12 and the Y sensor electrode 22 is smaller than a reference capacitance. In a case where each of the areas of the X sensor electrode 12 and the Y sensor electrode 22 is larger than the reference area, a capacitance formed between the X sensor electrode and the Y sensor electrode 22 is larger than the reference capacitance.

For example, in a case where adjacent two X sensor electrodes 12 are short-circuited to each other, the X sensor electrodes 12 have substantially a larger area and thus a capacitance formed therein increases. As a result, a higher sense signal is obtained. On the other hand, in a case where an X sensor electrode 12 has disconnection, it is impossible to obtain a sense signal from the X sensor electrode 12 properly. As a result, it is impossible to calculate the position of a detection target accurately.

This leads to a need for an inspection step of determining conditions of the X sensor electrodes 12 and the Y sensor electrode 22 so as to determine a sensor electrode having a disconnection or short circuit as a defective sensor electrode. Further, it is preferable that a widened or thinned X sensor electrode 12 or Y sensor electrode 22 is also determined as a defective sensor electrode.

As described above, a process for producing the touch panel includes a step of bonding two sensor substrates to each other (bonding step).

Even in a case where only either one of the X sensor electrodes 12 and the Y sensor electrodes 22 are determined as defective in the inspection step performed after the bonding step, it is necessary to discard both of the first sensor substrate 10 and the second sensor substrate 20. This leads to a decrease in yield.

On the other hand, according to the inspection method of Embodiment 1, it is possible to perform the inspection step prior to the bonding step, and thus it is only necessary to discard a sensor substrate on which a defective sensor electrode is formed. Therefore, the inspection method of Embodiment 1 is possible to improve a yield, in comparison with the conventional inspection step and production step.

<Inspection Method>

An inspection method of Embodiment 1 determines a condition of a sensor electrode by use of an inspection substrate.

Figure 4:
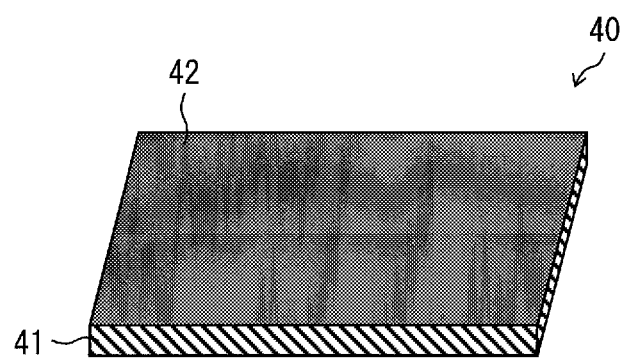
FIG. 4 is a perspective view of an inspection substrate which is used in an inspection method of Embodiment 1 of the present invention.

FIG. 4 is a perspective view of an inspection substrate which is used in the inspection method of Embodiment 1.

As illustrated in FIG. 4, an inspection substrate 40 includes (i) an insulation substrate 41 and (ii) an inspection electrode 42 (solid electrode), formed on one side of the insulation substrate 41, which is solid and has a known shape.

The "inspection electrode which has a known shape" herein refers to an electrode (i) not having a disconnection or a short circuit which is not expected by an inspector but (ii) having a shape according to the standards. The inspection electrode 42 can be made of a material such as copper or silver.

Figure 5:
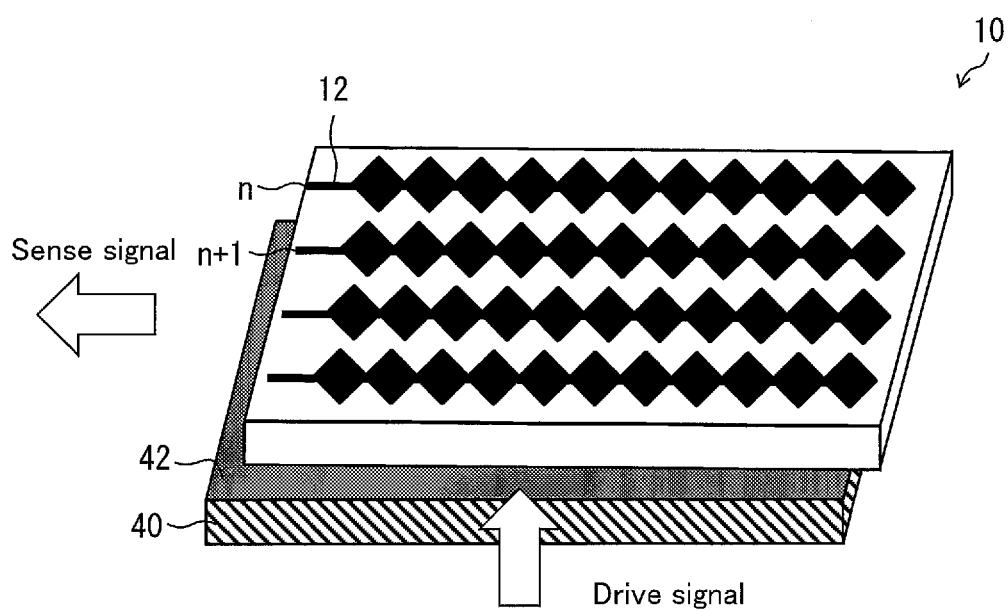
FIG. 5 is a perspective view showing a state where a first sensor substrate and an inspection substrate are caused to face each other in accordance with the inspection method of Embodiment 1 of the present invention.

FIG. 5 is a perspective view showing a state where the first sensor substrate and the inspection substrate are caused to face each other in accordance with the inspection method of Embodiment 1.

With the inspection method of Embodiment 1, it is possible to separately inspect the first sensor substrate 10 and the second sensor substrate 20. The following description will explain a case where the first sensor substrate 10 is inspected.

As illustrated in FIG. 5, according to the inspection method of Embodiment 1, an inspection is performed in a state where the inspection substrate 40 and the first sensor substrate 10, which is an inspection target, are caused to face each other. Preferably, a dielectric material (not illustrated) such as PolyEthylene Terephthalate (PET) or Cyclo Olefin Polymer (COP) is interposed between the inspection substrate 40 and the first sensor substrate 10.

Causing the inspection substrate 40 and the first sensor substrate 10 to face each other results in formation of capacitances (electric capacity) between the inspection electrode 42 and the X sensor electrodes 12.

Because the inspection electrode 42 is a solid electrode which is uniformly provided over the insulation substrate 41, distribution of the individual capacitances formed between the respective X sensor electrodes 12 and the inspection electrode 42 is defined according areas of the X sensor electrodes 12. Therefore, solely on the first sensor substrate 10 prior to the bonding step, it is possible to determine conditions of the X sensor electrodes 12 according to the capacitances, and then it is possible to determine whether or not the first sensor substrate 10 is defective according to the conditions of the X sensor electrodes 12.

The following description will specifically discuss the inspection method of Embodiment 1.

According to the inspection method of Embodiment 1, firstly, in a state where the inspection substrate 40 and the first sensor substrate 10 are caused to face each other so that capacitances are formed between the inspection electrode 42 and the X sensor electrodes 12, a drive signal is supplied to the inspection electrode 42 (step (I)). Consequently, sense signals according to the drive signal and the capacitances are supplied to the X sensor electrodes 12.

According to the inspection method of Embodiment 1, secondly, the sense signals are obtained from the X sensor electrodes 12 (step (II)).

Note that, according to the inspection method of Embodiment 1, (i) the supply of the drive signal and (ii) the obtaining of the sense signals can be performed in the same manner as in general driving of the touch panel. Specifically, according to the inspection method of Embodiment 1, the supply of the drive signal and the obtaining of the sense signals can be performed with use of the controller section 3 illustrated in FIG. 1.

Each of the sense signals can be obtained as an electric charge flowing through the respective X sensor electrode 12 or as a voltage. The following description will discuss an example where each of the sense signals is received as an electric charge.

According to the inspection method of Embodiment 1, thirdly, conditions of the X sensor electrodes 12 are determined according to the electric charges of the sense signals obtained from the X sensor electrodes 12 (step (III)). Specifically, in a case where an electric charge of a sense signal is within a range of a threshold, a condition of an X sensor electrode 12 related to the sense signal is determined to be normal. On the other hand, in a case where an electric charge of a sense signal is outside the range of the threshold, a condition of an X sensor electrode 12 related to the sense signal is determined to be abnormal.

The case where the condition of the X sensor electrode 12 is abnormal is, specifically, as follows. If an electric charge of a sense signal is under the threshold, there is a possibility that an X sensor electrode 12 related to the sense signal has disconnection or is made smaller than a predetermined size (i.e., the sensor electrode is thin). On the other hand, if an electric charge of a sense signal is above the threshold, there is a possibility that an X sensor electrode 12 related to the sense signal is short-circuited to an adjacent X sensor electrode 12 or is made larger than the predetermined size (i.e., the sensor electrode is wide).

According to the inspection method of Embodiment 1, solely on one of the sensor substrates (the first sensor substrate 10 or the second sensor substrate 20) prior to the bonding step of bonding the first sensor substrate 10 and the second sensor substrate 20 to each other, it is possible to determine conditions of the sensor electrodes (the X sensor electrodes 12 or the Y sensor electrodes 22) and then to determine whether or not the one of the sensor substrates is defective. Therefore, the inspection method of Embodiment 1 is possible to improve a yield, in comparison with the conventional producing step and inspection step.

The above description has explained the case where the drive signal is supplied to the inspection electrode 42 and the sense signals are obtained from the X sensor electrodes 12. However, the present invention is not limited to this. Alternatively, the drive signal may be supplied to the X sensor electrodes 12 and the sense signals may be obtained from the inspection electrode 42.

<Difference Sense Signal>

In the inspection method of Embodiment 1, the conditions of the sensor electrodes can be determined according to, instead of the sense signals, a difference sense signal, which is a difference between two or more sense signals.

Specifically, in a case where the first sensor substrate 10 includes an nX sensor electrode 12 (first sensor electrode) and an n+1X sensor electrode 12 (second sensor electrode) which are adjacent to each other, a difference sense signal is obtained that is a difference between (i) a sense signal n+1 obtained from the n+1X sensor electrode 12 and (ii) a sense signal n obtained from the nX sensor electrode 12 (i.e., (sense signal n+1)−(sense signal n)). The difference sense signal is regarded as a difference sense signal related to the nX sensor electrode 12, and a condition of the nX sensor electrode 12 is determined according to the difference sense signal.

This allows a removal of a noise component to increase an S/N ratio. Consequently, it is possible to obtain a difference sense signal having a signal level 5 to 20 times higher than that of the noise. This makes it possible to detect a disconnection or short circuit, according to positive or negative of the signal.

Further, in a touch panel including (i) X sensor electrodes 12 and (ii) dummy electrodes each of which is provided between corresponding ones of the X sensor electrodes in the form of a floating electrode, one of the X sensor electrodes 12 and one of the dummy electrodes may be short-circuited to each other, so that an area of the one of the X sensor electrodes 12 substantially increases. The dummy electrode is smaller in size in comparison to the X sensor electrode, and therefore it is difficult to detect a short-circuit between the dummy electrode and the X sensor electrode. However, by determining a condition of the X sensor electrode 12 according to the difference sense signal in the above-described manner, it is possible to perform an inspection with high accuracy and to detect a short-circuit between the dummy electrode and the X sensor electrode.

Note that the difference sense signal can be obtained, for example, by the signal obtaining section 33 of the controller section 3 illustrated in FIG. 1.

The above description has explained an example in which the difference sense signal is calculated from the sense signals obtained from two adjacent X sensor electrodes 12. However, the present invention is not limited to this. Alternatively, a difference sense signal may be calculated from sense signals obtained from three or more X sensor electrodes 12, or a difference sense signal may be calculated from sense signals obtained from two X sensor electrodes 12 which are not adjacent to each other.

<Another Example of Inspection Method>

Figure 6:
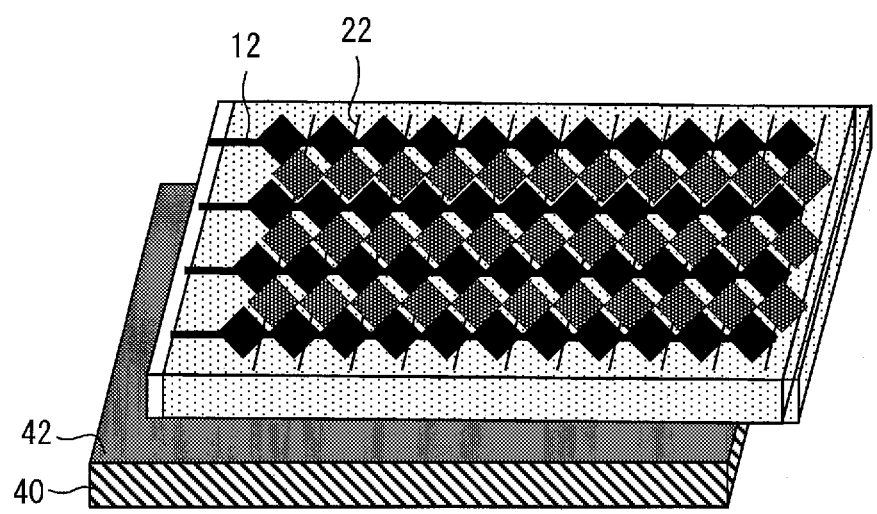
FIG. 6 is a perspective view showing a state where (i) a first sensor substrate and a second sensor substrate (ii) and an inspection substrate are caused to face each other in accordance with another inspection method of Embodiment 1 of the present invention.

FIG. 6 is a perspective view showing a state where (i) a first sensor substrate and a second sensor substrate (ii) and an inspection substrate are caused to face each other in accordance with another inspection method of Embodiment 1.

It is preferable that the inspection method of Embodiment 1 is performed solely on the first sensor substrate 10 or the second sensor substrate 20 prior to the bonding step. However, the present invention is not limited to this.

Alternatively, as illustrated in FIG. 6, in a state where the first sensor substrate 10 and the second sensor substrate 20 are bonded to each other, a drive signal may be supplied to the inspection electrode 42, and then sense signals may be obtained from either one of the X sensor electrodes 12 and the Y sensor electrodes 22, so that conditions of the either one of the X sensor electrodes 12 or the Y sensor electrodes 22 are determined.

Embodiment 2

The following description will discuss, with reference to FIGS. 7 through 12, another embodiment of the present invention. For convenience of description, members of the present embodiment that have functions identical to those described in the above-described embodiment are given identical reference numerals, and descriptions of such members will be omitted.

Figure 7:
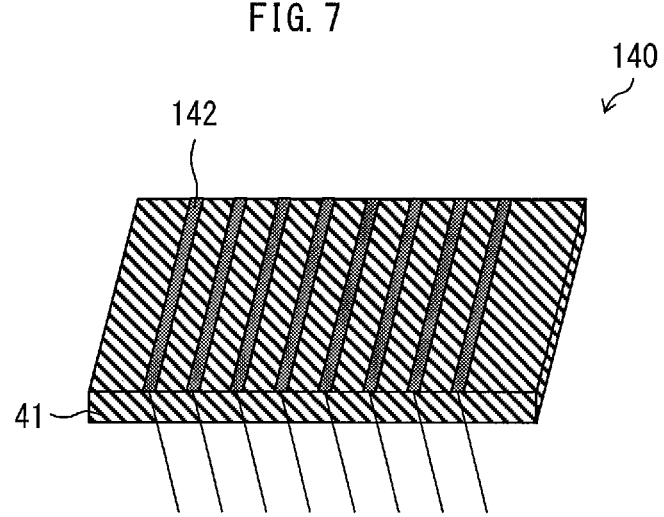
FIG. 7 is a perspective view of an inspection substrate which is used in an inspection method of Embodiment 2 of the present invention.

FIG. 7 is a perspective view of an inspection substrate which is used in an inspection method of Embodiment 2 of the present invention.

As illustrated in FIG. 7, an inspection substrate 140 which is used in the inspection method of Embodiment 2 includes (i) an insulation substrate 41 and (ii) a plurality of inspection electrodes 142, which are formed on one side of the insulation substrate 41 and each of which has a known shape. The inspection electrodes 142 extend in a substantially same direction. The inspection electrode 142 can be made of a material such as copper or silver. FIG. 7 illustrates, as an example, the inspection electrodes 142 arranged in stripes. However, the present invention is not limited to this. Alternatively, inspection electrodes which are arranged in a diamond pattern as well as the X sensor electrodes 12 can be used.

Figure 8:
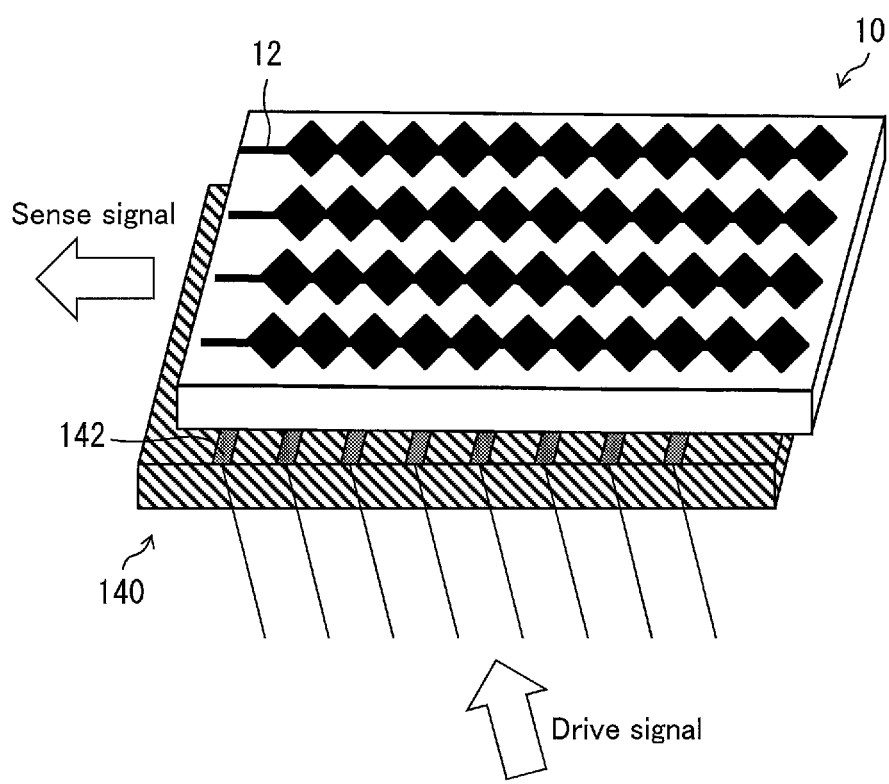
FIG. 8 is a perspective view showing a state where a first sensor substrate and an inspection substrate are caused to face each other in accordance with an inspection method of Embodiment 2 of the present invention.

FIG. 8 is a perspective view showing a state where a first sensor substrate and an inspection substrate are caused to face each other in accordance with the inspection method of Embodiment 2.

As illustrated in FIG. 8, according to the inspection method of Embodiment 2, an inspection is performed in a state where the inspection substrate 140 and the first sensor substrate 10, which is as an inspection target, are caused to face each other so that the X sensor electrodes 12 and the inspection electrodes 142 cross each other in a plan view. It is more preferable that the inspection substrate 140 and the first sensor substrate 10, which is an inspection target, are caused to face each other so that the X sensor electrodes 12 and the inspection electrodes 142 are orthogonal to each other in a plan view.

This allows formation of a capacitance (electric capacity) at each of intersections of the inspection electrodes 142 and the X sensor electrodes 12. Note that it is not essential for the X sensor electrodes 12 and the inspection electrodes 142 to be orthogonal to each other. It is at least necessary for the inspection electrodes 142 and the X sensor electrodes 12 to cross each other in a plan view.

Distribution of the capacitances formed between the X sensor electrodes 12 and the inspection electrodes 142 is defined according to areas of the X sensor electrodes 12 at the respective intersections. Therefore, solely on the first sensor substrate 10 prior to the bonding step, it is possible to determine conditions of the X sensor electrodes 12 according to the capacitances.

The following description will specifically discuss the inspection method of Embodiment 2.

According to the inspection method of Embodiment 2, firstly, drive signals are supplied to the inspection electrodes 142 in a state where the inspection substrate 140 and the first sensor substrate 10 are caused to face each other (step (I)). The drive signals may be supplied to the inspection electrodes 142 either sequentially or simultaneously.

Consequently, sense signals according to (i) the drive signals and (ii) the capacitances at the respective intersections are supplied to the X sensor electrodes 12.

According to the inspection method of Embodiment 2, secondly, the sense signals are obtained from the X sensor electrodes 12 (step (II)).

According to the inspection method of Embodiment 2, thirdly, conditions of parts of the X sensor electrodes 12 which parts are positioned at the respective intersections are determined according to electric charges of the sense signals (i) which have been obtained from the X sensor electrodes 12 and (ii) which correspond to the capacitances at the respective intersections (step (III)).

Specifically, in a case where an electric charge of a sense signal corresponding to a capacitance at one of the intersections is within a range of a threshold, a condition of a part of the corresponding X sensor electrode 12 which part is in the vicinity of the one of the intersections is determined to be normal. On the other hand, in a case where an electric charge of a sense signal corresponding to a capacitance at one of the intersections outside the range of the threshold, a condition of a part of the corresponding X sensor electrode 12 which part is in the vicinity of the one of the intersections is determined to be abnormal.

Note that in a case where an electric charge of a sense signal corresponding to a capacitance at one of the intersections is under the threshold, there is a possibility that the corresponding X sensor electrode 12 has disconnection in the vicinity of the one of the intersections or has been made smaller than a predetermined size. On the other hand, in a case where an electric charge of a sense signal corresponding to a capacitance at one of the intersections is above the threshold, there is a possibility that the corresponding X sensor electrode 12 is short-circuited in the vicinity of the one of the intersections or has been made larger than the predetermined size.

In a case where a sensor module including two kinds of sensor electrodes is inspected as an inspection target sample as in the inspection method disclosed in Patent Literature 1, the following problem occurs. That is, even if the sensor module is determined to be defective, it is impossible to identify which of the sensor electrodes is a cause of the defect.

On the other hand, according to the inspection method of Embodiment 2, solely on the first sensor substrate 10 or the second sensor substrate 20 prior to the bonding step of bonding the first sensor substrate 10 and the second sensor substrate 20 to each other, it is possible to accurately detect conditions of the X sensor electrodes 12 or the Y sensor electrodes 22. Therefore, the inspection method of Embodiment 2 is possible improve a yield, in comparison with the conventional producing step and inspection step.

Further, according to the inspection method of Embodiment 2, it is possible to identify a defective part of the sensor electrode at each intersection. This makes it easy to repair the detective part so as to make the sensor substrate usable.

The above description has explained an example in which the drive signals are supplied to the inspection electrodes 142, and the sense signals are obtained from the X sensor electrodes 12. However, the present invention is not limited to this. Alternatively, drive signals may be supplied to the X sensor electrodes 12, and sense signals may be obtained from the inspection electrodes 142. Either of the above examples can provide the same inspection results.

<Another Example of Inspection Method>

Figure 9:
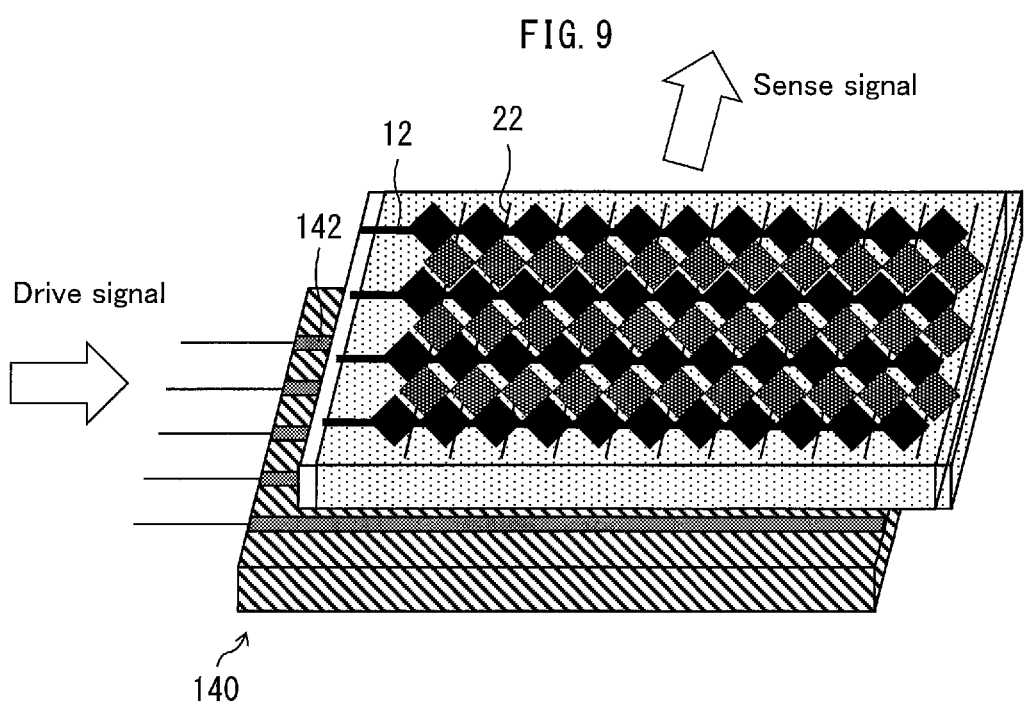
FIG. 9 is a perspective view showing a state where a first and a second sensor substrates and an inspection substrate are caused to face each other in accordance with another inspection method of Embodiment 2 of the present invention.

FIG. 9 is a perspective view showing a state where (i) a first sensor substrate and a second sensor substrate (ii) and an inspection substrate are caused to face each other in accordance with another inspection method of Embodiment 2.

As illustrated in FIG. 9, according to the inspection method of Embodiment 2, a drive signal may be supplied to the inspection electrodes 142 in a state where the first sensor substrate 10 and the second sensor substrate 20 are bonded to each other, sense signals may be obtained from either one of the X sensor electrodes 12 and the Y sensor electrodes 22, so that conditions of the either one of the X sensor electrodes 12 and the Y sensor electrodes 22 are determined, as in the inspection method of Embodiment 1.

FIG. 9 illustrates positioning of the inspection electrodes for determining conditions of the Y sensor electrodes 22. The inspection substrate 140 is positioned so that the Y sensor electrodes 22 and the inspection electrodes 142 are orthogonal to each other in a plan view. This makes it possible to perform an inspection to determine the conditions of the Y sensor electrodes 22.

<Example of Inspection Result>

In the inspection method of Embodiment 2, capacitances at the respective intersection may be calculated according to the sense signals obtained, and values of the capacitances may be mapped to create a two-dimensional image, so that a defective part is visually identified.

Figure 10:
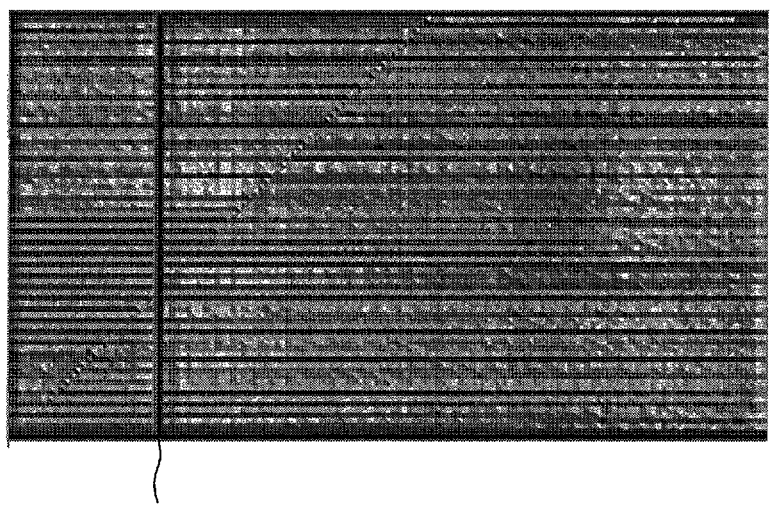
FIG. 10 shows an example of a two-dimensional map indicative of values of capacitances at respective intersections.
Figure 11:
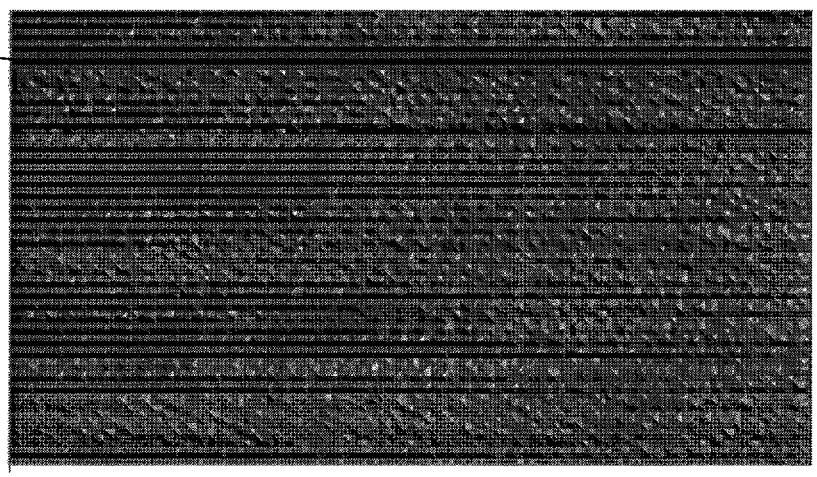
FIG. 11 shows another example of a two-dimensional map indicative of values of capacitances at respective intersections.

FIG. 10 shows an example of a two-dimensional map indicative of the values of the capacitances at the respective intersections. FIG. 11 shows another example of a two-dimensional map indicative of the values of the capacitances at the respective intersections. By obtaining a two-dimensional map 50, which shows a two-dimensional image indicative of the capacitances at the respective intersections as illustrated in FIG. 10 and FIG. 11, it is possible to easily visually detect a disconnection part of the sensor electrodes. Further, a defective part of the sensor electrodes may be detected by comparing the two-dimension map 50 with capacitances at respective intersections obtained as a result of an inspection performed on a non-defective sensor electrode.

Figure 12:
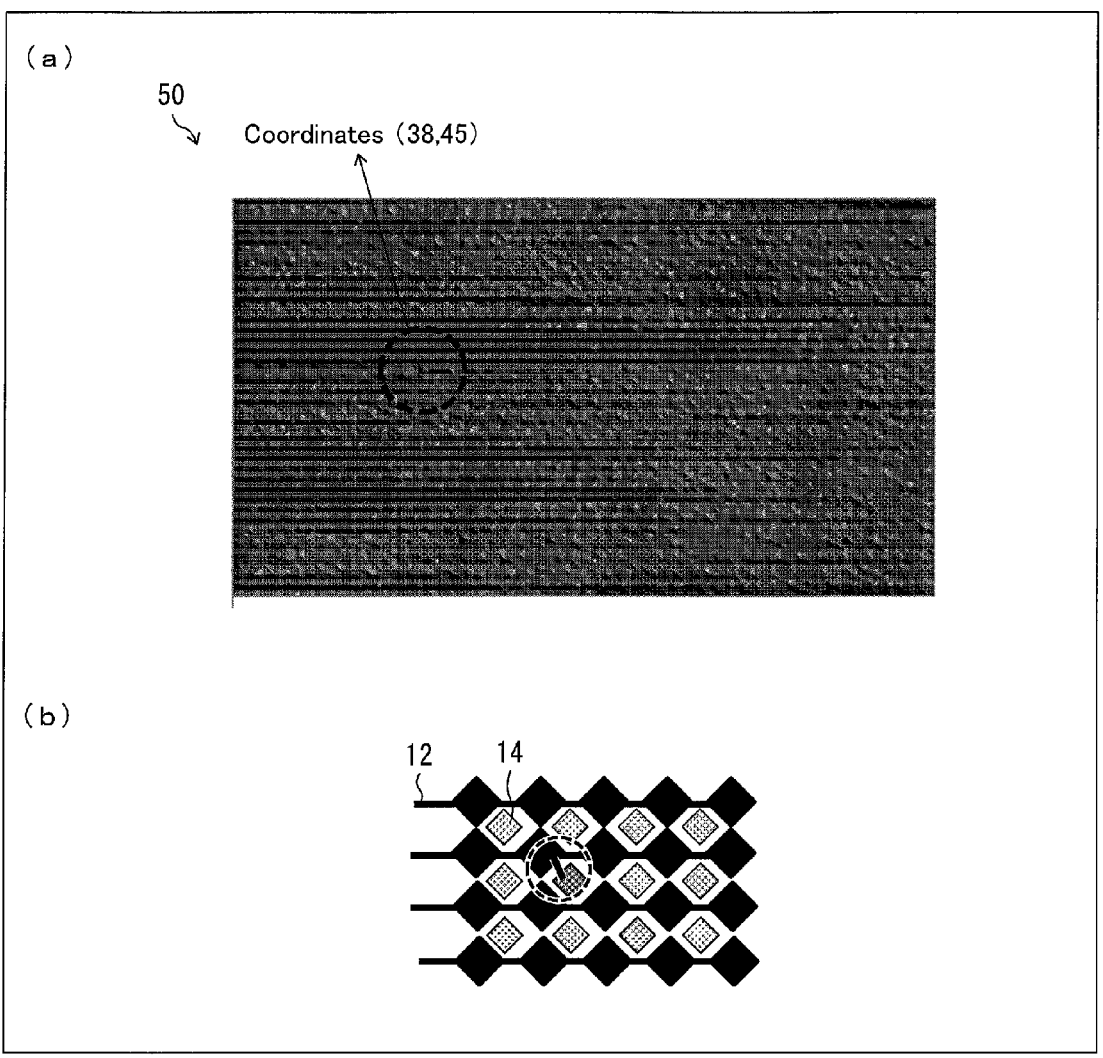
FIG. 12 illustrates how a defective part is identified with use of a two-dimensional map. (a) of FIG. 12 shows an example of a two-dimensional map indicative of values of capacitances at respective intersections. (b) of FIG. 12 illustrates a part where a sensor electrode and a dummy electrode are short-circuited to each other.

FIG. 12 illustrates how a defective part is identified with use of a two-dimension map. (a) of FIG. 12 shows an example of a two-dimensional map indicative of values of capacitances at respective intersections. (b) of FIG. 12 shows a part where a sensor electrode and a dummy electrode are short-circuited to each other.

As illustrated in (a) of FIG. 12, in a case where a capacitance at given coordinates (38, 45) is above the threshold, there is a possibility that an X sensor electrode 12 and a dummy electrode 14 are short-circuited to each other at a position corresponding to the coordinates, as illustrated in (b) of FIG. 12.

In this way, according to the inspection method of Embodiment 2, it is possible to precisely identify a defective part.

The above description has explained an example where the detection is performed by the comparison involving use of a two-dimensional map. However, the detection method is not limited to this. Alternatively, for example, the detection may also be performed by (i) comparing values of capacitances at respective points on the sensor electrodes with those of a reference sample (for example, a normal or non-defective product) additionally obtained and (ii) identifying a defective part of the sensor electrodes according to the result of the comparison.

FIG. 13 illustrates how a defective part is identified according to a result of comparison between capacitances of two kinds of sensor substrates. (a) of FIG. 13 illustrates values of capacitances at respective intersections on a sensor substrate which is an inspection target. (b) of FIG. 13 illustrates values of capacitances at respective intersections on a comparative sensor substrate. (c) of FIG. 13 illustrates differences between (i) the values of the capacitances at the respective intersections on the sensor substrate and (ii) the values of the capacitances at the respective intersections on the comparative sensor substrate.

As illustrated in (a) and (b) of FIG. 13, values of capacitances at respective 25 intersections, at which five X sensor electrodes and five inspection electrodes cross each other, are obtained from each of the sensor substrate and the comparative sensor substrate. Further, the values of the capacitances at the respective intersections on the comparative sensor substrate are subtracted from those of the sensor substrate.

This gives, as illustrated in (c) of FIG. 13, differences between (i) the capacitances at the respective intersections on the sensor substrate and (ii) those of the comparative sensor substrate. Further, in a case where a difference in capacitance obtained at a certain intersection is beyond a predetermined threshold, the sensor electrodes may be determined to have a defective part at the certain intersection.

In the example of the inspection result shown in FIG. 13, a difference in capacitance obtained at an intersection at which an X sensor electrode (Sense 3) and an inspection electrode (Drive 3) cross each other is beyond the threshold (for example, a range from −0.5 to 0.5). From this, it is possible to determine that the X sensor electrode has a defective part in the vicinity of the intersection. Specifically, in the example above, the difference in capacitance is above an upper limit of the threshold, the X sensor electrode is considered to have a short-circuit in the vicinity of the intersection.

In the example above, it is preferable that the comparative sensor substrate is a normal (non-defective) sensor substrate. This makes it possible to accurately identify a defective part of the X sensor electrodes with reference to the normal sensor substrate.

As illustrated in (a) of FIG. 13, there is a case where an abnormal capacitance value caused by a defective part is inconspicuous due to variations in the capacitances at the respective intersections. In this case, it is difficult to identify the defective part only according to the capacitances at the respective intersections on the sensor substrate.

In order to deal with this, by obtaining the differences in the capacitances at the respective intersections, the abnormal capacitance value caused by the defective part is made conspicuous, as illustrated in (c) of FIG. 13. Thus, it possible to identify the defective part of the X sensor electrodes easily and accurately.

Embodiment 3

Figure 14:
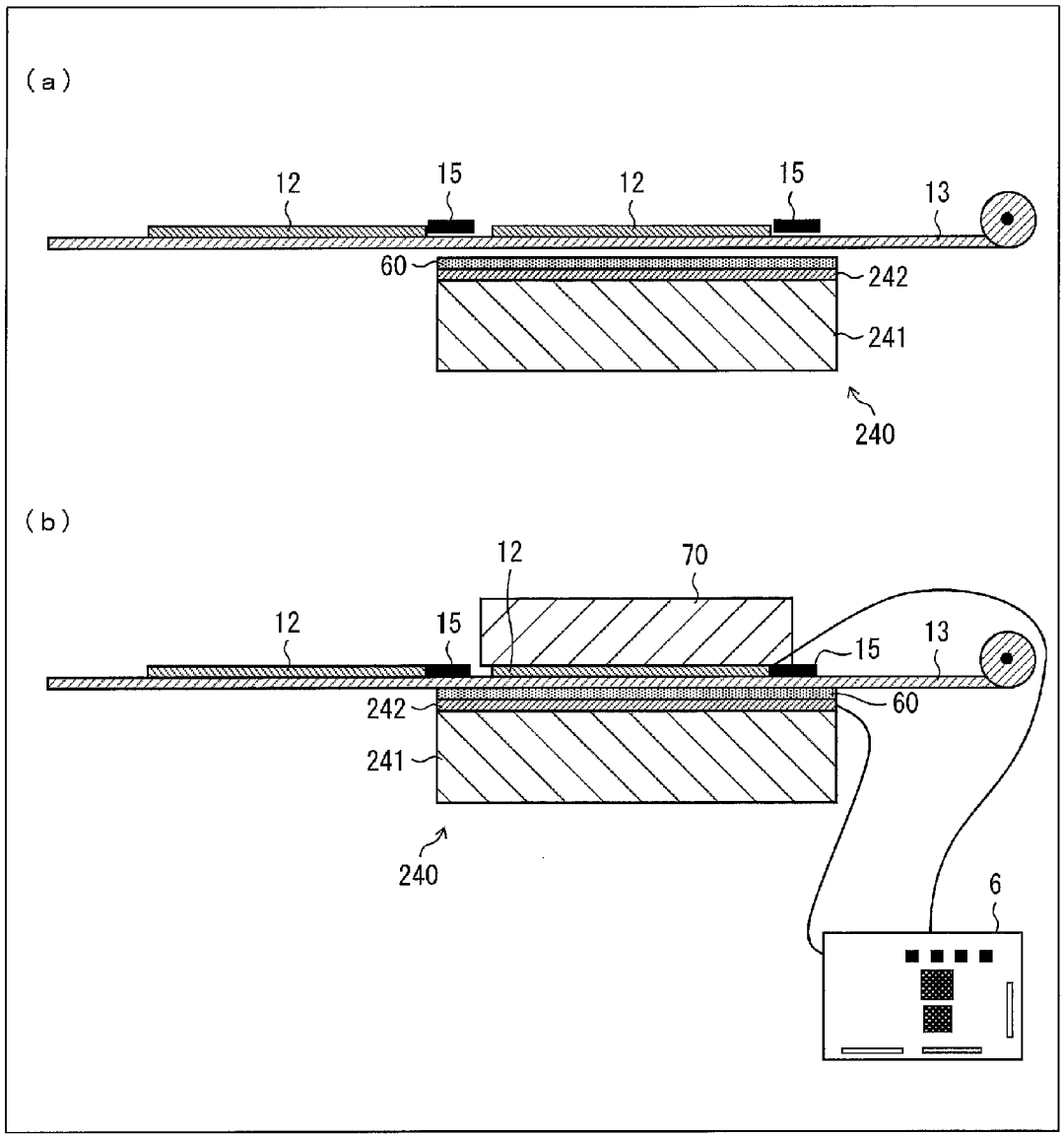
FIG. 14 shows cross-sectional views of a base film and an inspection substrate for explaining an inspection method of Embodiment 3 of the present invention. (a) of FIG. 14 shows a state where the base film and the inspection substrate are not in close contact with each other. (b) of FIG. 14 shows a state where the base film and the inspection substrate are in close contact with each other.

The following description will discuss, with reference to FIGS. 14 and 15, another embodiment of the present invention. For convenience of description, members of the present embodiment that have functions identical to those described in the above-described embodiment are given identical reference numerals, and descriptions of such members will be omitted.

FIG. 14 shows cross-sectional views of a base film and an inspection substrate for explaining an inspection method of Embodiment 3 of the present invention. (a) of FIG. 14 shows a state where the base film and the inspection substrate are not in close contact with each other. (b) of FIG. 14 shows a state where the base film and the inspection substrate are in close contact with each other.

The inspection method of Embodiment 3 is an inspection process which is applied to a roll-to-roll producing process. Note that the roll-to-roll producing process herein refers to a process of, as illustrated in FIG. 14, (i) forming a plurality of touch-panel X sensor electrodes 12 on a single base film 13 and thereafter (ii) cutting the base film, so as to produce touch panels.

As illustrated (a) of FIG. 14, an inspection substrate 240 includes (i) a dielectric substrate 241 and (ii) an inspection electrode 242, which is formed on one side of the dielectric substrate 241 and which has a known shape. The inspection substrate 240 serves as an inspection table. The inspection electrode 242 may be a solid electrode or may be a plurality of electrodes formed in stripes.

The inspection substrate 240 is fixed in its position. On the inspection electrode 242, a dielectric layer 60 is formed.

On the base film 13, (i) the plurality of touch-panel X sensor electrodes 12 and (ii) a terminal section 15 for connecting the X sensor electrodes 12 to an external terminal are formed.

The base film 13 and the inspection substrate 240 are positioned so as to face each other so that the X sensor electrodes 12 and the inspection electrode 242 are orthogonal to each other.

As illustrated (b) of FIG. 14, during an inspection process, a dielectric panel 70 is placed on the X sensor electrodes 12 so that a weight is applied onto the X sensor electrodes 12, and consequently the X sensor electrodes 12, the dielectric layer 60, and the inspection electrode 242 are brought into close contact with each other. This yields a pseudo-capacitive type touch panel including the X sensor electrodes 12, the dielectric layer 60, and the inspection electrode 242.

Further, the inspection electrode 242 is connected to the drive line driving section (not illustrated) of the controller section 3. Furthermore, the terminal sections 15 for the respective X sensor electrodes 12, which are an inspection target, are connected to the amplifier (not illustrated) of the controller section 3.

In this state, a drive signal is supplied to the inspection electrode 242, and sense signals are obtained from the X sensor electrodes 12. Thus, it is possible to perform an inspection in the same manner as in Embodiments 1 and 2.

FIG. 14 shows an example in which the X sensor electrodes 12 and the terminal sections 15 are formed on a surface of the base film 13 not facing the inspection substrate 240. However, the present invention is not limited to this. Alternatively, the X sensor electrodes 12 and the terminal sections 15 may be formed on a surface of the base film 13 facing the inspection substrate 240.

Note that PET or COP can be used suitably as the dielectric layer 60, and acrylic can be used suitably as the dielectric substrate 241 and the dielectric panel 70.

With the dielectric panel 70, it is possible (i) to apply a weight for bringing the X sensor electrodes 12 and the inspection electrode 242 into close contact with each other and (ii) to prevent entry of a noise into the X sensor electrodes 12 and/or the inspection electrode 242 during an inspection.

As described above, by performing an inspection in a state where the dielectric panel 70 (dielectric layer), the X sensor electrodes 12, the dielectric layer 60, the base film 13 (dielectric layer), the inspection electrode 242, and the dielectric substrate 241 (dielectric layer) are stacked in this order without a gap, it is possible to determine conditions of the X sensor electrodes 12 more accurately, because there is no air layer between these members.

Further, a dielectric panel 70 and/or a dielectric substrate 241 each of which is sufficiently electrically larger than that of a region where the X sensor electrodes 12 and the inspection electrode 242 are formed may be used. This makes it possible to prevent the entry of noise more efficiently.

Another Example

FIG. 15 shows cross-sectional views of a base film and an inspection substrate for explaining another inspection method of Embodiment 3 of the present invention. (a) of FIG. 15 shows a state where the base film and the inspection substrate are not in close contact with each other. (b) of FIG. 15 shows a state where the base film and the inspection substrate are in close contact with each other.

According to another inspection method of Embodiment 3, as illustrated in (a) of FIG. 15, an inspection substrate 340 includes (i) a dielectric substrate 341 and (ii) an inspection electrode 342 which is formed on one side of the dielectric substrate 341 and has a known shape. On the inspection electrode 342, a dielectric layer 60 is formed.

As illustrated (b) of FIG. 15, during an inspection process, the inspection substrate 340 is placed on the base film 13 so that X sensor electrodes 12 are interposed between the base film 13 and a dielectric stage 71, which serves as an inspection table. The dielectric stage 71 can be suitably made of a material such as acrylic.

According to the example above, by pressing the base film 13 onto the dielectric stage 71 with use of the inspection substrate 340, it is possible to easily electrically connect a terminal section 15 to one of the terminals of the controller section 3, thereby making it possible to perform an inspection efficiently.

SUMMARY

An inspection method in accordance with Aspect 1 of the present invention is a method for inspecting a touch panel (1) which includes a plurality of sensor electrodes (X sensor electrode 12, Y sensor electrode 22) extending in a substantially same direction, said method comprising the steps of: (I) supplying a drive signal to either one of the plurality of sensor electrodes and at least one inspection electrode (42, 142, 242, 342) in a state where capacitances are formed between the plurality of sensor electrodes and the at least one inspection electrode; (II) obtaining a plurality of sense signals from the other one of the plurality of sensor electrodes and the at least one inspection electrode, the plurality of sense signals being generated according to the drive signal and the capacitances, and the plurality of sense signals being related to the respective plurality of sensor electrodes; and (III) determining conditions of the plurality of sensor electrodes according to the plurality of sense signals.

With this method, in an inspection of a touch panel including (i) a first sensor substrate including X sensor electrodes and (ii) a second sensor substrate including Y sensor electrodes extending in a direction different from that of the X sensor electrodes, it is possible to perform an inspection solely on the first sensor substrate or the second sensor substrate before the first sensor substrate and the second sensor substrate are bonded to each other, in order to determine conditions of the sensor electrodes.

According to the conventional inspection method, an inspection is performed after the first sensor substrate and the second sensor substrate are bonded to each other. Thus, even in a case where only either one of the X sensor electrodes or the Y sensor electrodes are defective, both of the first sensor substrate and the second sensor substrate need to be discarded as being defective.

On the other hand, according to the inspection method in accordance with Aspect 1, it is possible to perform an inspection before the first sensor substrate and the second sensor substrate are bonded to each other. This makes it possible to improve a yield.

Furthermore, according to the inspection method in accordance with Aspect 1, conditions of the sensor electrodes are determined according to the sense signals obtained, in response to the supply of the drive signal to either one of the sensor electrodes and the inspection electrode, from the other of the sensor electrodes and the inspection electrode. Therefore, there are less external factors which may affect an inspection result obtained by this inspection method as compared with the conventional inspection method. Therefore, according to the inspection method in accordance with Aspect 1, it is possible to perform an inspection with high accuracy.

An inspection method in accordance with Aspect 2 of the present invention may be arranged such that, in Aspect 1, the plurality of sensor electrodes are provided on a sensor substrate; the at least one inspection electrode comprises a plurality of inspection electrodes, provided on an inspection substrate, extending in a substantially same direction; in the step (I), the supply of the drive signal is performed in a state where the inspection substrate and the sensor substrate are caused to face each other so that the plurality of inspection electrodes and the plurality of sensor electrodes cross each other in a plan view; in the step (II), the plurality of sense signals obtained are generated according to the drive signal and the capacitances formed at respective intersections of the plurality of sensor electrodes and the plurality of inspection electrodes in a plan view, and are related to the respective intersections; and in the step (III), conditions of parts of the plurality of sensor electrodes which parts are positioned at the respective intersections are determined according to the plurality of sense signals related to the respective intersections.

With this method, it is possible to precisely identify a defective part of the sensor electrodes in association with the respective intersections at which the sensor electrodes and the inspection electrodes cross each other. This method improves workability in repairing the defective part of the sensor electrodes so that the sensor substrate is made usable as a non-defective sensor substrate.

An inspection method in accordance with Aspect 3 of the present invention may be arranged such that, in Aspect 2, the method further includes the step of: creating a two-dimensional image (two-dimensional map 50) indicative of, in association with the respective intersections, values of the capacitances, wherein in the step (III), a defective part of the plurality of sensor electrodes is identified according to the two-dimensional image.

With this method, it is possible to visually identify a defective part of the sensor electrodes. This improves working efficiency in inspection.

An inspection method in accordance with Aspect 4 of the present invention may be arranged such that, in Aspect 2, a defective part of the plurality of sensor electrodes is identified according to a result of comparison between (i) values of the capacitances at the respective intersections on the sensor substrate and (ii) values of capacitances at respective intersections on another sensor substrate serving as a comparative sensor substrate.

With this method, it is possible to accurately identify a defective part of the X sensor electrodes with reference to the comparative sensor substrate.

An inspection method in accordance with Aspect 5 of the present invention may be arranged such that, in Aspect 1, the plurality of sensor electrodes are provided on a sensor substrate (first sensor substrate 10, second sensor substrate 20); the at least one inspection electrode is a solid electrode formed on an inspection substrate (40, 140, 240, 340); in the step (I), the drive signal is supplied to the solid electrode in a state where the inspection substrate and the sensor substrate are caused to face each other; and in the step (II), the plurality of sense signals are obtained from the plurality of sensor electrodes.

With this method, it is possible to detect conditions of the sensor electrodes by use of the inspection substrate of a simple configuration.

An inspection method in accordance with Aspect 6 of the present invention may be arranged such that, in any one of Aspects 1 through 5, the plurality of sensor electrodes comprises (i) a first sensor electrode and (ii) a second sensor electrode which is different from the first sensor electrode; in the step (II), a difference sense signal is obtained, the difference sense signal being a difference between (i) a sense signal related to the first sensor electrode and (ii) a sense signal related to the second sensor electrode; and in the step (III), a condition of the first sensor electrode is determined according to the difference sense signal.

This method reduces effects given by a noise included in the sense signals, thereby increasing an S/N ratio. With this method, it is thus possible to perform an inspection accurately.

An inspection method in accordance with Aspect 7 of the present invention may be arranged such that, in any one of Aspects 1 through 6, the conditions of the plurality of sensor electrodes are determined in a state where at least a dielectric layer, the plurality of sensor electrodes, a dielectric layer, the at least one inspection electrode, and a dielectric layer are stacked in this order without a gap.

According to the method above, it is possible to detect the conditions of the sensor electrodes in a state where the sensor electrodes are interposed between the two dielectric layers, the inspection electrode is interposed between the two dielectric layers, and no air layer exists therebetween. With this method, it is possible to detect the conditions of the sensor electrodes more accurately.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is preferably applicable to a process for inspecting a capacitive type touch panel.

REFERENCE SIGNS LIST

1 Touch panel
10 First sensor substrate (sensor substrate)
12 X sensor electrode (sensor electrode)
20 Second sensor substrate (sensor substrate)
22 Y sensor electrode (sensor electrode)
40, 140, 240, 340 Inspection substrate
42, 142, 242, 342 Inspection electrode
50 Two-dimensional map (two-dimensional image)

The invention claimed is:

1. A method for inspecting a touch-panel electrode substrate which includes a plurality of sensor electrodes extending in a substantially same direction, said method comprising the steps of:
(I) supplying a drive signal to either one of the plurality of sensor electrodes and at least one inspection electrode in a state where capacitances are formed between the plurality of sensor electrodes and the at least one inspection electrode;
(II) obtaining a plurality of sense signals from the other one of the plurality of sensor electrodes and the at least one inspection electrode, the plurality of sense signals being generated according to the drive signal and the capacitances, and the plurality of sense signals being related to the respective plurality of sensor electrodes; and
(III) determining conditions of the plurality of sensor electrodes according to the plurality of sense signals; wherein:
the plurality of sensor electrodes are provided on a sensor substrate;
the at least one inspection electrode comprises a plurality of inspection electrodes, provided on an inspection substrate, extending in a substantially same direction;
in the step (I), the supply of the drive signal is performed in a state where the inspection substrate and the sensor substrate are caused to face each other so that the plurality of inspection electrodes and the plurality of sensor electrodes cross each other in a plan view;
in the step (II), the plurality of sense signals obtained are generated according to the drive signal and the capacitances formed at respective intersections of the plurality of sensor electrodes and the plurality of inspection electrodes in a plan view, and are related to the respective intersections;
in the step (III), conditions of parts of the plurality of sensor electrodes which parts are positioned at the respective intersections are determined according to the plurality of sense signals related to the respective intersections; and
a defective part of the plurality of sensor electrodes is identified according to a result of comparison between (i) values of the capacitances at the respective intersections on the sensor substrate and (ii) values of capacitances at respective intersections on another sensor substrate serving as a comparative sensor substrate.

2. The method as set forth in claim 1, wherein:
the plurality of sensor electrodes comprises (i) a first sensor electrode and (ii) a second sensor electrode which is different from the first sensor electrode;
in the step (II), a difference sense signal is obtained, the difference sense signal being a difference between (i) a sense signal related to the first sensor electrode and (ii) a sense signal related to the second sensor electrode; and
in the step (III), a condition of the first sensor electrode is determined according to the difference sense signal.

3. The method as set forth in claim 1, wherein:
the conditions of the plurality of sensor electrodes are determined in a state where at least a dielectric layer, the plurality of sensor electrodes, a dielectric layer, the at least one inspection electrode, and a dielectric layer are stacked in this order without a gap.

4. A method for inspecting a touch-panel electrode substrate which includes a plurality of sensor electrodes extending in a substantially same direction, said method comprising the steps of:
(I) supplying a drive signal to either one of the plurality of sensor electrodes and at least one inspection electrode in a state where capacitances are formed between the plurality of sensor electrodes and the at least one inspection electrode;
(II) obtaining a plurality of sense signals from the other one of the plurality of sensor electrodes and the at least one inspection electrode, the plurality of sense signals being generated according to the drive signal and the capacitances, and the plurality of sense signals being related to the respective plurality of sensor electrodes; and
(III) determining conditions of the plurality of sensor electrodes according to the plurality of sense signals; wherein:
the plurality of sensor electrodes are provided on a sensor substrate;
the at least one inspection electrode is a solid electrode formed on an inspection substrate;

in the step (I), the drive signal is supplied to the solid electrode in a state where the inspection substrate and the sensor substrate are caused to face each other; and in the step (II), the plurality of sense signals are obtained from the plurality of sensor electrodes.

5. The method as set forth in claim 4, wherein:

the plurality of sensor electrodes comprises (i) a first sensor electrode and (ii) a second sensor electrode which is different from the first sensor electrode;

in the step (II), a difference sense signal is obtained, the difference sense signal being a difference between (i) a sense signal related to the first sensor electrode and (ii) a sense signal related to the second sensor electrode; and in the step (III), a condition of the first sensor electrode is determined according to the difference sense signal.

6. The method as set forth in claim 4, wherein:

the conditions of the plurality of sensor electrodes are determined in a state where at least a dielectric layer, the plurality of sensor electrodes, a dielectric layer, the at least one inspection electrode, and a dielectric layer are stacked in this order without a gap.

* * * * *